(12) United States Patent
Gautier et al.

(10) Patent No.: US 9,137,477 B2
(45) Date of Patent: Sep. 15, 2015

(54) FAST CHANNEL CHANGE COMPANION STREAM SOLUTION WITH BANDWIDTH OPTIMIZATION

(75) Inventors: Eric Gautier, Cesson Sevigne (FR); Anthony Laurent, Cesson Sevigne Cedex (FR); David Touze, Cesson Sevigne Cedex (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 452 days.

(21) Appl. No.: 13/359,003

(22) Filed: Jan. 26, 2012

(65) Prior Publication Data
US 2012/0163476 A1    Jun. 28, 2012

(30) Foreign Application Priority Data
Feb. 4, 2011    (EP) .................................... 11153435

(51) Int. Cl.
| | |
|---|---|
| *H04N 7/12* | (2006.01) |
| *H04H 20/71* | (2008.01) |
| *H04N 7/10* | (2006.01) |
| *H04N 5/50* | (2006.01) |
| *H04N 21/2343* | (2011.01) |
| *H04N 21/438* | (2011.01) |
| *H04N 21/44* | (2011.01) |
| *H04N 21/2365* | (2011.01) |

(Continued)

(52) U.S. Cl.
CPC ............. *H04N 5/50* (2013.01); *H04N 21/2365* (2013.01); *H04N 21/23439* (2013.01); *H04N 21/234363* (2013.01); *H04N 21/242* (2013.01); *H04N 21/4307* (2013.01); *H04N 21/4384* (2013.01); *H04N 21/44016* (2013.01)

(58) Field of Classification Search
CPC . H04N 7/50; H04N 7/26941; H04N 21/2365; H04N 21/4347; H04N 7/26244; H04W 72/005; H04W 52/0216; H04W 4/06; H04W 8/26; H04L 12/185
USPC .......................... 375/240.26; 370/312; 725/32
See application file for complete search history.

(56) References Cited

U.S. PATENT DOCUMENTS

| | | |
|---|---|---|
| 2005/0117055 A1 | 6/2005 | Kerofsky |
| 2006/0215997 A1* | 9/2006 | Kamio et al. ................... 386/95 |
| 2007/0044123 A1 | 2/2007 | Zriny et al. |

(Continued)

FOREIGN PATENT DOCUMENTS

| | | |
|---|---|---|
| EP | 1487215 | 12/2004 |
| WO | WO-2005112465 | 11/2005 |
| WO | WO2008151987 | 12/2008 |

OTHER PUBLICATIONS

European Search Report dated Mar. 23, 2011.

(Continued)

*Primary Examiner* — Dave Czekaj
*Assistant Examiner* — Tsion B Owens
(74) *Attorney, Agent, or Firm* — Tutunjian & Bitetto, P.C.

(57) ABSTRACT

The present invention concerns a method for reducing the channel change time in a broadcast television system by encoding a termed companion service in addition to the main service. The companion service is sent along with the original service and helps the receiver to retrieve and display the new service more rapidly during the channel change process. With this solution the service is encoded and streamed in its original format, plus encoded and streamed in a low resolution format.

16 Claims, 5 Drawing Sheets

(51) Int. Cl.
  *H04N 21/242* (2011.01)
  *H04N 21/43* (2011.01)

(56) References Cited

U.S. PATENT DOCUMENTS

| | | | |
|---|---|---|---|
| 2007/0121629 | A1 | 5/2007 | Cuijpers et al. |
| 2007/0266398 | A1 | 11/2007 | Vandaele |
| 2008/0155586 | A1* | 6/2008 | Yang et al. .................. 725/32 |
| 2009/0064242 | A1 | 3/2009 | Cohen et al. |
| 2009/0290644 | A1 | 11/2009 | Gordon et al. |
| 2010/0104009 | A1 | 4/2010 | Hardacker et al. |
| 2011/0096713 | A1* | 4/2011 | Rusert et al. ............... 370/312 |

OTHER PUBLICATIONS

Gu et al., "An IPTV fast channel change scheme in multicast environment", Journal of Beijing University of Posts and Télécommunications, vol. 32, No. 6, Dec. 2009, pp. 5-8. English Abstract.

Fuchs et al., "Subjective Evaluation of Low Resolution Tune-in Streams for IPTV Fast Channel Change", IEEE International Symposium on Broadband Multimedia Systems and Broadcasting (BMSB), May 13, 2009, pp. 1-5.

ISO/IEC 13818-1, "Information Technology—Generic coding of moving pictures and associated audio information: Systems", International Standard, Third Edition, Oct. 15, 2007, pp. 1-188.

ITU-T H.222.0, "Series H: Audiovisual and Multimedia Systems: Infrastructure of audiovisual services—Transmission multiplexing and synchronization", Information technology—Generic coding of moving pictures and associated audio information: Systems, May 2006, pp. 1-190.

Erratum 1 to ITU-T Recommendation H.222.0 (2006), "Information technology—Generic coding of moving pictures and associated audio information: Systems, Amd.2 (Aug. 2007)", General Secretariat of the International Telecommunication Union, Jun. 3, 2008, pp. 1.

ITU-T H.222.0, "Series H: Audiovisual and Multimedia Systems, Infrastructure of audiovisual services—Transmission multiplexing and synchronization", ITU—Generic coding of moving pictures and associated audio information Systems, Amendment 1: Transport of MPEG-4 streaming text and MPEG-4 lossless audio over MPEG-2 systems, Jan. 2001, pp. 1-22.

ITU-T H.222.0 Amendment 2, "Series H: Audiovisual and Multimedia Systems, Infrastructure of audiovisual services—Transmission multiplexing and synchronization", Information technology—Generic coding of moving pictures and associated audio information: Systems Amendment 2: Carriage of auxiliary video data, Aug. 2007, pp. 1-12.

ITU-T H.222.0 Amendment 3, "Series H: Audiovisual and Multimedia Systems, Infrastructure of audiovisual services—Transmission multiplexing and synchronization", Information technology—Generic coding of moving pictures and associated audio information: Systems Amendment 3: Transport of scalable video over Rec. ITU-T H.222.0 | ISO/IEC 13818-1, Mar. 2009, pp. 1-28.

ITU-T H.222.0, Amendment 4, "Series H: Audiovisual and Multimedia Systems. Infrastructure of audiovisual services—Transmission multiplexing and synchronization", Information technology—Generic coding of moving pictures and associated audio information: Systems Amendment 4: Transport of multiview video over Rec. ITU-T H.222.0 | ISO/IEC 13818-1, Dec. 2009, pp. 1-30.

ITU-T H.222.0, Corrigendum 1, "Series H: Audiovisual and Multimedia Systems. Infrastructure of audiovisual services—Transmission multiplexing and synchronization", Information technology—Generic coding of moving pictures and associated audio information: Systems Technical Corrigendum 1: Correction of zero_byte syntax element and stream_id_extension mechanism, Jun. 2008, pp. 1-14.

ITU-T H.222.0 Corrigendum 2, "Series H: Audiovisual and Multimedia Systems. Infrastructure of audiovisual services—Transmission multiplexing and synchronization", Information technology—Generic coding of moving pictures and associated audio information: Systems Technical Corrigendum 2—Correction of transfer rate Rxn in the T-STD model, Mar. 2009, pp. 1-8.

ITU-T H.222.0 Corrigendum 3, "Series H: Audiovisual and Multimedia Systems. Infrastructure of audiovisual services—Transmission multiplexing and synchronization", Information technology—Generic coding of moving pictures and associated audio information: Systems Technical Corrigendum 3: Corrections concerning VBV buffer size, semantics of splice_type and removal rate from transport buffer for ITU-T H.264 | ISO/IEC 14496-10 advanced video coding, Dec. 2009, pp. 1-8.

ITU-T H.222.0 Corrigendum 4, "Series H: Audiovisual and Multimedia Systems. Infrastructure of audiovisual services—Transmission multiplexing and synchronization", Information technology—Generic coding of moving pictures and associated audio information: Systems Technical Corrigendum 4: Corrections to Amendment 3 on transport of scalable video over Rec. ITU-T H.222.0 | ISO/IEC 13818-1, Dec. 2009, pp. 1-8.

ITU-T H264, "Series H: Audiovisual and Multimedia Systems—Infrastructure of audiovisual services—Coding of moving video", Advanced video coding for generic audiovisual services, Mar. 2010, pp. 1-676.

* cited by examiner

FAST CHANNEL CHANGE COMPANION STREAM SOLUTION WITH BANDWIDTH OPTIMIZATION

This application claims the benefit, under 35 U.S.C. §119 of EP Patent Application 11153435.0, filed 4 Feb. 2011.

FIELD OF THE INVENTION

The present invention relates generally to a method for channel change time optimization and more particularly to a method to reduce the time to display a new selected program with bandwidth optimization.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many innovations have improved the television experience over the past few years, as for example the number of programs, the digital treatment, the definition of the pictures and the way to broadcast programs to the users over some new types of networks. However during this period the television experience has also suffered from specific drawbacks like the channel change time. Today it may take sometimes several seconds to change the display from one channel to another one, when it was nearly instantaneous with the analog television system in the past. This drawback is particularly true for IPTV and mobile systems but is generally impacting all digital broadcasting systems, regardless of the medium they are carried upon.

Video distribution via broadband or broadcast networks uses standard compression systems such as MPEG-2 (ISO/IEC 13818) or JVT/H.264/MPEG AVC. The MPEG standards define the GoP (Group of Pictures). The GoP defines a sequence of I, P, B type pictures. These pictures are also defined in the MPEG standards. The I picture (Intra) is encoded without reference to any other picture. The P (Predictive) picture is described with respect to preceding pictures. The B (Bidirectional) picture is described with respect to preceding and following pictures. When a receiver receives a program, it waits for the reception of an I picture to start decoding. This causes a delay prior to the display of a new film, particularly in the case of zapping. Hence, when the user changes the channel, time passes before display of the new channel on the screen. This time is divided between the the time to receive a decodable I picture in the stream and the time to fill the reception memory.

According to MPEG video compression standards, some time stamps are transmitted from the encoder to the decoder. The transport stream carrying the audio/video program includes some program clock reference information (PCR) which carries samples of system time clock (STC) used by the encoding system. The time information is used to synchronize the clock system in the decoder. The elementary stream for an audio/video program carries some time information called presentation time stamps (PTS) which indicate the time when the audio/video data should be available in the decoder for the rendering of the program. Thus, a PTS indicates the value of the PCR when the video content of a program is displayed by the decoder.

Several solutions exist in order to improve the channel change time, by adding an additional stream whose structure is such that a decodable picture is more rapidly found to be able to display it. This is what is defined for example in the patent application WO2005112465A1. An improvement of this solution to reduce the channel change time is known by introducing a delay between the main stream and the additional stream in order for the decoder to receive a decodable picture still earlier.

The figures FIG. 3, FIG. 4 and FIG. 5. illustrate some channel change solutions already known. The stream is a sequence of GoPs. The presentation time stamp information (PTS) associated with the I-picture is shown in the figures and the successive program clock reference (PCR) values indicate the time when the pictures are displayed.

FIG. 3 illustrates a standard channel change method in a television system using a video compression standard such as MPEG. From the channel change command, the receiver waits for the next I picture in the program stream and then decodes and displays the incoming pictures from the moment when the program clock reference (PCR) fits the presentation time stamp associated with the I-picture. The time interval between the channel change command and the next I picture is called Random Access Point (RAP). The time interval between the first I-picture received and the value of the PCR to display is called $\Delta_{PCR/PTS}$. Finally the time between the channel change command and the start of the rendering is $RAP+\Delta_{PCR/PTS}$. By using this solution, the channel change delay may be important.

FIG. 4 illustrates an optimized channel change method in a television system using a video compression standard as MPEG by using a secondary program stream delivered to the receiver in parallel of the main program stream. The secondary stream is encoded in a lower resolution than the main stream and the GOP size of the secondary stream is reduced with respect to the GOP size of the main stream. The receiver then receives the next I picture earlier compared to a channel change method where only one program stream is transmitted. The time from the channel change command to the rendering of the program is reduced compared to the channel change solution described in FIG. 3.

FIG. 5 illustrates an optimized channel change method in a television system using a video compression standard as MPEG by using a secondary program stream delivered to the receiver in parallel of the main stream with a delay between the main program stream and the secondary program stream. Thus the next I picture associated with a given presentation time stamp is received later according to the solution presented in FIG. 4 by the receiver and the time in the reception buffer is smaller than without delay. The time $\Delta_{PCR/PTS}$ is reduced. This optimizes the channel change time compared to the solution described in FIG. 4.

However, an additional stream always requires the use of additional bandwidth to carry a program and this is a drawback for the transmission.

SUMMARY OF THE INVENTION

The purpose of the invention is to overcome the disadvantage of the prior art. More specifically, the purpose of the invention is to reduce the bandwidth required to transmit the additional video program stream used in addition of the main video program stream in order to reduce the channel change delay.

The present invention relates to a method suitable to reduce the channel change time at the receiver side of a television system by using an additional stream and optimizing the bandwidth for transmission of the additional stream.

Although it is applicable to either a broadband or a broadcast television system, the invention focuses on a broadcast television system for which the optimization is more important.

The invention concerns a method in a video encoder for reducing the channel change delay at a video decoder side. The method comprises the step of encoding a video program from a video source in a first video stream which has a first level of picture resolution, this first video stream comprising first groups of pictures and a first time information associated to each first groups of pictures. The method also comprises the step of encoding the video program from the video source in a second video stream which has a level of picture resolution lower than the picture resolution of the first video stream. The second video stream comprises second groups of pictures and a second time information associated to each second groups of pictures. The method is characterized in that it further comprises the step of transmitting a part of said second groups of pictures according to a comparison result between the first and second time information and at least a weighted information representative of duration of the first groups of pictures.

The method of the invention permits to save easily the bandwidth required to transmit the second video stream, by identifying the groups of pictures that are redundant with the ones of the main stream for a receiver/decoder. The method avoids the transmission of these groups of pictures. An advantage of this method is that there is no difference at the receiver side. Any receiver that operates with a different encoding/transmission method including two streams for channel change delay optimization also operates with the method of the invention.

According to a variant of the invention, the resolutions of the pictures are defined only by the number of pictures inserted in the groups of pictures.

According to an embodiment of the invention, the weighted information is an encoding parameter multiplied by the duration of the first groups of pictures.

According to an embodiment of the invention, the first and second time information are presentation time stamps according to MPEG compression standards.

According to an embodiment of the invention, the first and second video streams are compliant to MPEG-2 standard.

According to an embodiment of the invention, the comparison between said first and second time information and at least a weighted information representative of duration of said first groups of pictures is defined as follows:

$$-\alpha \le (PTS_{Lm} - PTS_{Hn})/GOP_F \le \beta$$

where $\alpha$ and $\beta$ are encoding parameters, $PTS_{Hn}$ is the presentation time stamp of the $n^{th}$ group of pictures of said first groups of pictures, $PTS_{Lm}$ is the presentation time stamp of the $m^{th}$ group of pictures of said second groups of pictures, and $GOP_F$ is the duration of said first groups of pictures.

Another object of the invention is an analyzer module adapted to receive a first video program and a second video program and to deliver a third video program, the video programs being composed of successive groups of pictures comprising time information associated with each groups of pictures, and adapted for the transmission of a part of the groups of pictures of the second video program to build a third video program according to a comparison result of the time information of the groups of pictures from the first and second video programs and at least a weighted information representative of duration of the groups of pictures of the first video program.

The inventions also concerns a video encoder comprising a high resolution encoding module encoding a first video program and a low resolution encoding module encoding a second video program, the video programs being composed of successive groups of pictures comprising time information associated with each groups of pictures, and an analyzer module adapted for the transmission of a part of the groups of pictures of the second video program to build a third video program according to a comparison result of the time information of the groups of pictures from said first and second video programs and at least a weighted information representative of duration of the groups of pictures of the first video program.

BRIEF DESCRIPTION OF THE DRAWINGS

The invention will be better understood and illustrated by means of the following embodiment and execution examples, in no way limitative, with reference to the appended figures on which:

In FIG. 1 and FIG. 2, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
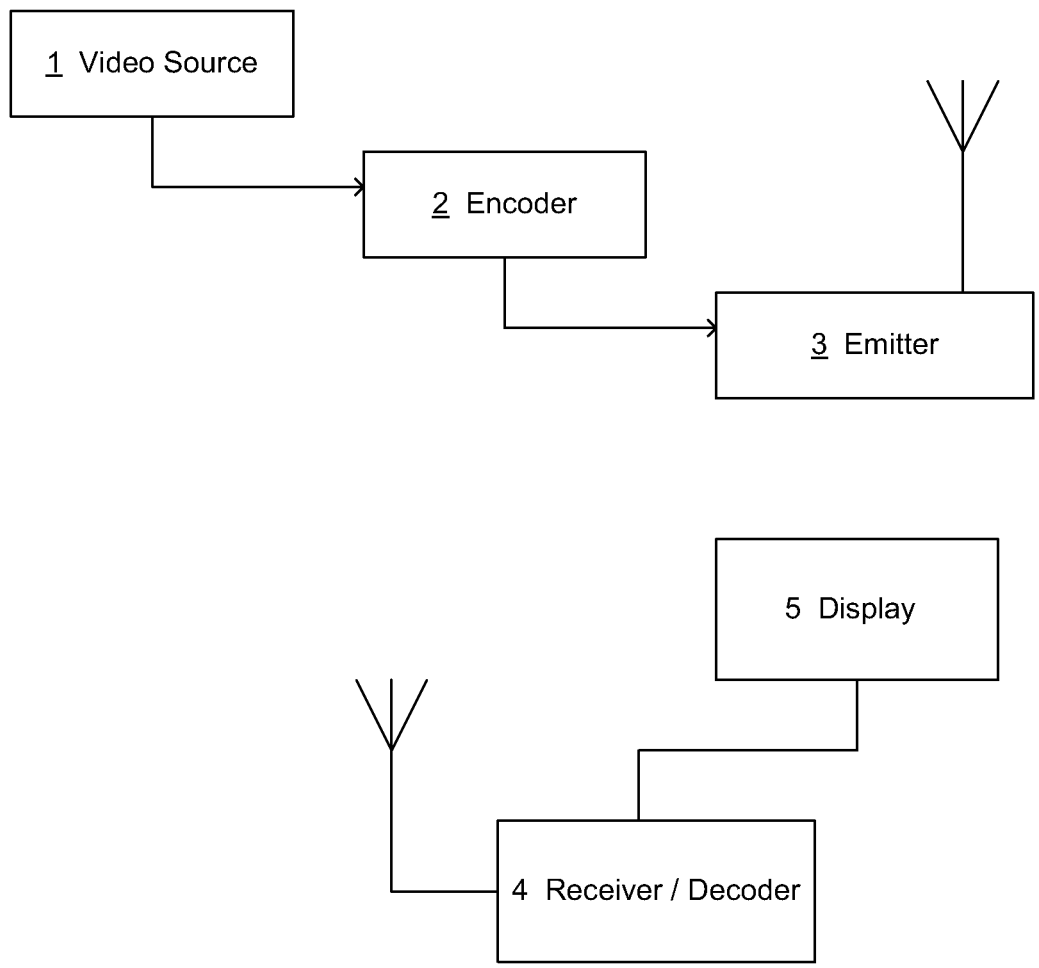
FIG. 1 is a block diagram of a system compliant with a preferred embodiment of the invention.

FIG. 1 describes a broadcast system according to a preferred embodiment of the invention. A video source 1 delivers a program to an encoder 2. The encoder encodes a first program in a full resolution according to the MPEG-2 compression standard and a second program in a lower resolution. According to the embodiment, the encoder includes a GOP analyzer module that compares PTS information associated with I picture of each GOP for both programs and delivers or not the GOP for the second program by predicting the redundancy of GOP at the receiver side. Both streams are then packetized in a transport stream format according to MPEG-2 standard and multiplexed in order to be broadcasted through the air by the emitter 3. The receiver/decoder 4 connected to the broadcasted signal receives the transport stream and operates the decoding of the program in order to display the video program on a display device 5. The receiver/decoder 4 operates a selection of the first encoded program (full resolution) or the second encoded program (lower resolution) after a channel change command in order to make the rendering of the program delivered by the source 1 as soon as possible on the display device 5. Then, if the second program is selected for the channel change, the receiver/decoder 4 switches to the first program to provide the full resolution of pictures to the display device 5 as soon as it gets a I-picture from the first program.

Figure 2:
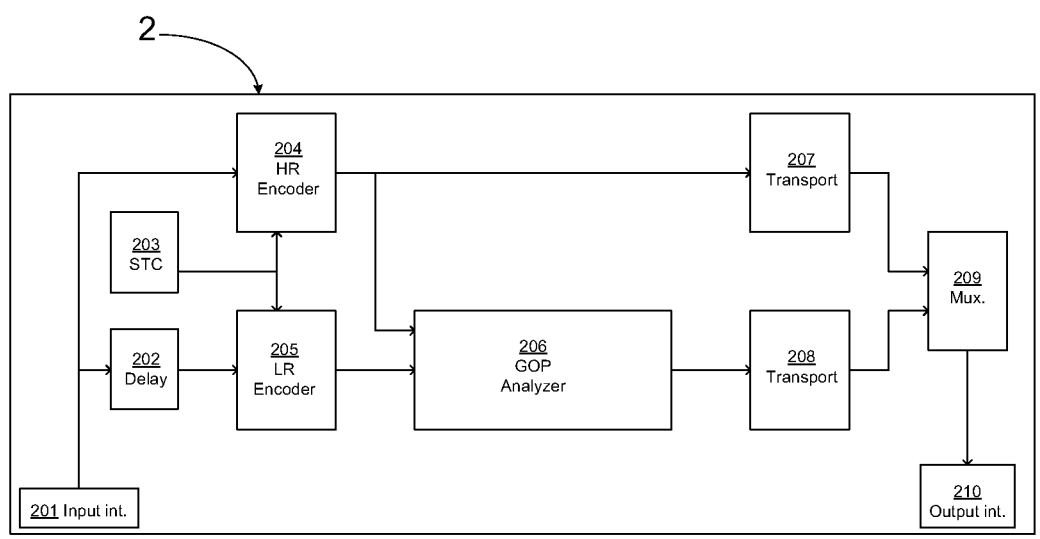
FIG. 2 is a block diagram of an encoder compliant with a preferred embodiment of the invention.
Figure 3:
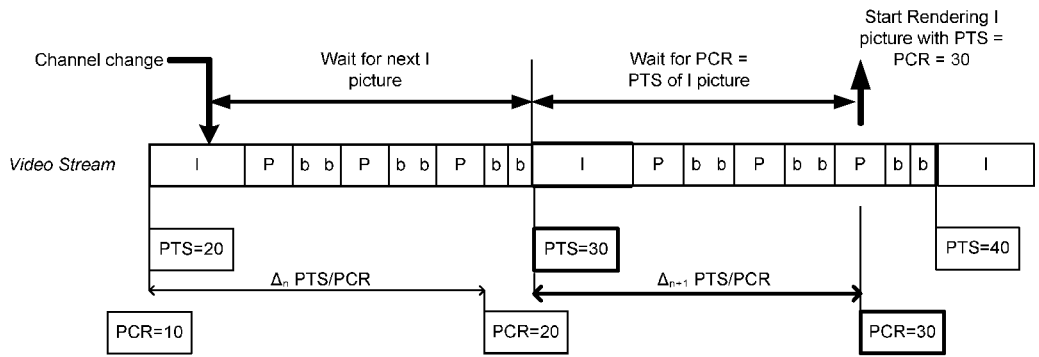
FIG. 3 illustrates a channel change without rendering optimization.
Figure 4:
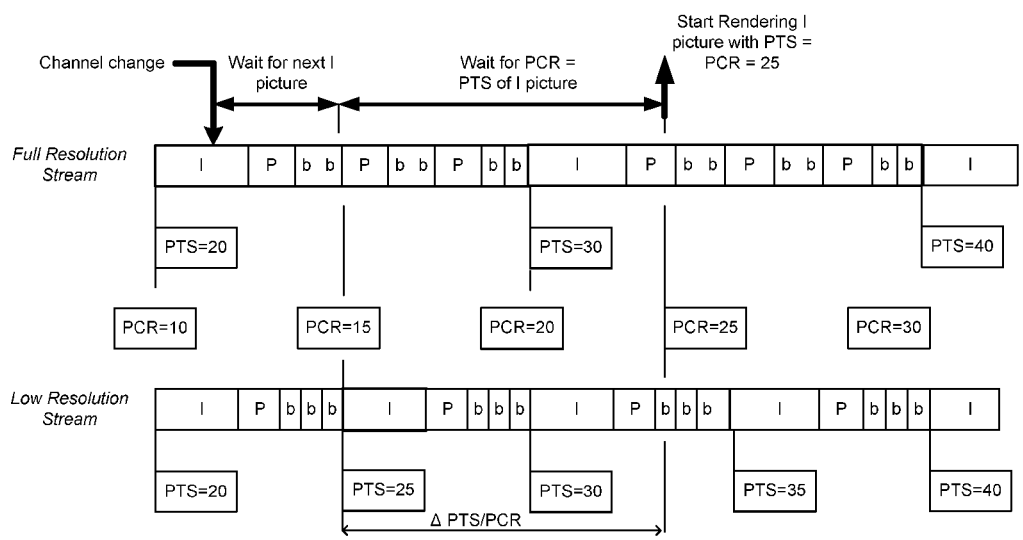
FIG. 4 illustrates a channel change with rendering optimization thanks to the use of a second stream synchronized with the main stream.
Figure 5:
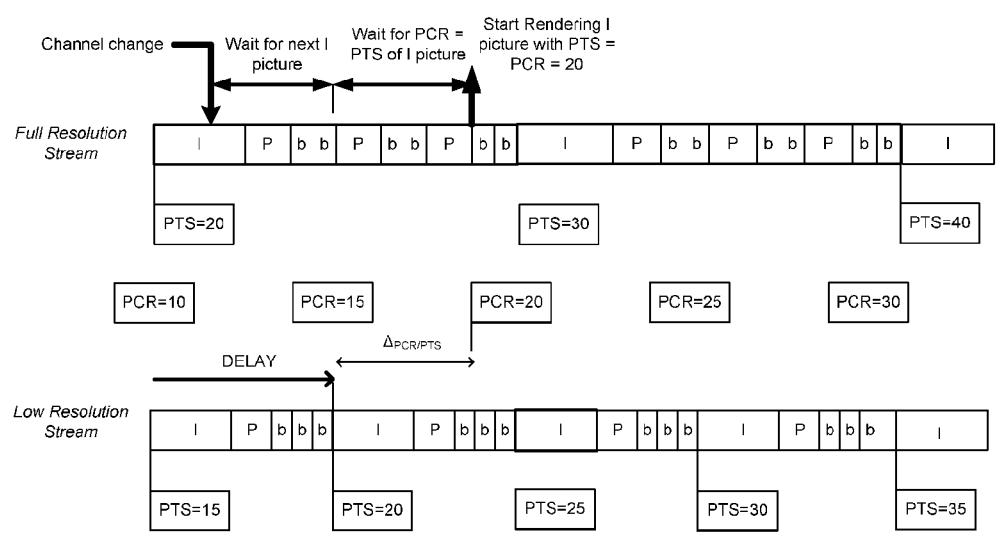
FIG. 5 illustrates a channel change with rendering optimization thanks to the use of a second stream delayed in respect with the main stream.

FIG. 2 describes an encoder according to the embodiment. The encoder includes a control unit such as a microprocessor (not represented) associated with a memory for the configuration and the control of the encoder 2. A source signal corresponding to a video program is delivered to an input interface 201 and is encoded in a high resolution of pictures and converted in a first program stream by a high resolution (HR) encoding module 204. The encoded signal from the HR encoder is then processed by a transport module 207 which packetizes the program stream in a MPEG-2 compliant transport stream. This transport stream is then transmitted to a multiplexer module 209 to be concatenated with another transport stream delivered by the transport module 208. The multiplexer module delivers a lone transport stream at the output interface 210 for further processing as modulation and transmission.

In a second path of the encoder, the source signal is delayed by a delay module 202 before being encoded in a low resolution of pictures and converted in a second program stream by a low resolution (LR) encoding module 205. The delay module 202 is used to delay the second program stream in respect with the first program stream in order to decrease the time to get an I picture at the receiver side. Both program streams are encoded according to MPEG-2 compression standard.

A System Time Clock module 203 delivers the system time clock (STC) to encoding modules 204 and 205 in order to include presentation time stamps (PTS) in the program streams. The PTS information of a program indicates to a receiver the time when the receiver starts the display of the pictures. Each GoP of a program stream is associated with a PTS information included in the stream by the encoding module and associated with the I-picture of the GoP.

The PTS information is used at the receiver side to synchronize the display of the program according to the program clock reference (PCR). When a receiver decodes a picture, it reads the corresponding PTS information and starts the read of the display buffer to display the picture when the PCR value matches the PTS value.

PTS values are then to be considered in respect with the PCR clock. The PCR clock is transmitted to the receivers in the multiplexed transport stream.

Basically the program clock reference (PCR) synchronizes the encoder and a decoder in the transmission system. The PCR is based on the STC clock and is inserted by the multiplexer module 209 before transmission through the output interface.

Considering that the program streams delivered by the HR encoder and the LR encoder are composed of successive GoPs, $PTS_{Hn}$ represents the presentation timestamp of the I-picture of the $n^{th}$ GoP of the first program stream encoded in a full resolution of picture and $PTS_{Lm}$ represents the presentation timestamp of the I-picture of the $m^{th}$ Gop of the second program stream encoded in a low resolution of picture.

According to the embodiment, a GoP analyzer module 206 analyzes the redundancy of the GoPs between the first program stream and the second program stream. If a GoP of the second program stream is redundant, the GoP analyzer 206 skips the GoP in the second program stream. The GoP is not transmitted in order to reduce the bandwidth required to transmit the second program stream.

A GoP of the second program stream is declared redundant and is consequently not transmitted as soon as the associated PTS value is close to the PTS of the GoP of the first program stream.

Two cases are conceivable. The I-picture of a GoP of the second program stream has to be presented either before or after the I-picture of the first program stream.

In the first case, if the difference between the presentation time stamps $PTS_{Hn}$ and $PTS_{Lm}$ is smaller than a threshold, the GoP of the second program stream is not transmitted because the channel change delay improvement is not significant enough. The channel change delay improvement is related to the average channel change delay that depends on the first program stream GoP duration. So the threshold for the first case depends on this value.

In this first case a GoP of the second program stream is declared redundant if it fulfills the following formula:

$$0 \le PTS_{Hn} - PTS_{Lm} \le \alpha \times GOP_F$$

where $\alpha$ represents a percentage and $GOP_F$ represents the duration of a GoP of the main stream.

In the second case, the GoP of the second program stream has a presentation time stamp that is higher than the presentation time stamp of the first program stream. That means that when the user changes the channel, the received may miss the I-picture of the first program stream but it may receive an I-picture of the second program stream to be presented just after and consequently the channel change delay is improved.

In some cases, it is estimated that the channel change delay improvement is not sufficient with respect to the bandwidth cost to justify the delivery of a GoP of the second program stream. When the difference between $PTS_{Hn}$ and $PTS_{Lm}$ is too small, the probability of a channel change in this range is considered as too small. Another threshold is then introduced for this case. If the difference between the presentation time stamps is smaller than this threshold, the GoP of the second program stream is not transmitted.

It corresponds to the following formula:

$$0 \le PTS_{Lm} - PTS_{Hn} \le \beta \times GOP_F$$

where $\beta$ represents a percentage and $GOP_F$ represents the duration of a GoP of the first program stream.

When concatening both formulas the condition for which a GoP is not transmitted is:

$$-\alpha \le (PTS_{Lm} - PTS_{Hn})/GOP_F \le \beta$$

$\alpha$ and $\beta$ are values defined at the encoder side. Each one is a compromise between the change channel delay and the second program stream bandwidth saving. In practical, it is considered that $\alpha$ and $\beta$ parameters are defined in a range from 5% to 10%. These values correspond to the sensibility of the user while operating a channel change. It is considered that there is no need to send a GOP on the second stream in order to reduce the channel change delay if the optimization is not noticeable enough for the user.

Figure 6:
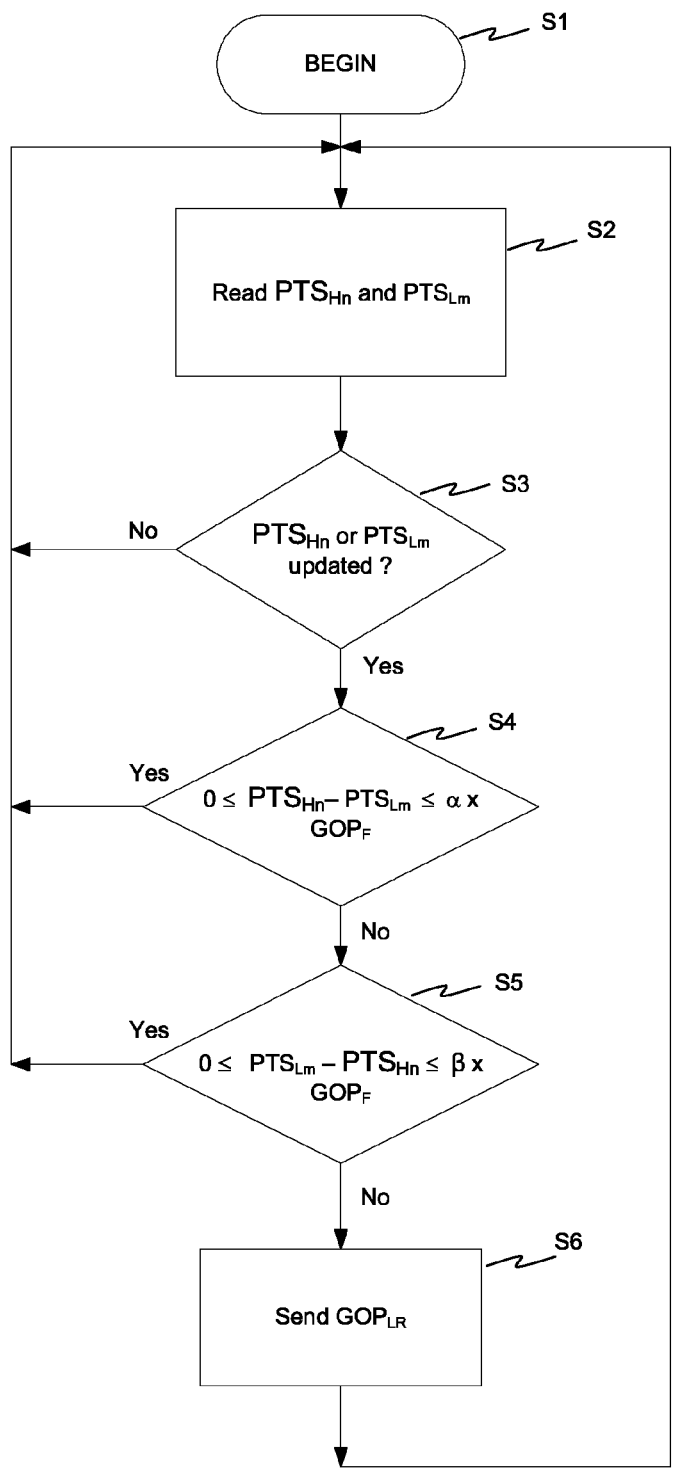
FIG. 6 is a flowchart describing the process of the GOP analyzer within the encoder according to a preferred embodiment of the invention.

FIG. 6 is a flowchart illustrating the process of the GOP analyzer module inside the encoder. As explained before, two conditions are taken into account to define if a GoP of the low resolution program stream is redundant with a GoP of the high resolution program stream at a receiver side, for the video rendering.

S1 is the initialization step of the GoP analyzer. At this step α and β thresholds are loaded in the GoP analyzer. These parameters are used to define the redundancy of a GoP of the second program stream (low resolution program stream) by comparing its current PTS to the current PTS of the corresponding GoP of the first program stream (full resolution program stream).

S2 represents the step when the analyzer waits for the next I picture in the full resolution program stream and the next I picture in the low resolution program stream.

S3 is a test to define the moment when a new PTS value have been read in the I picture of the GoP for any of the streams. Once a new PTS have been read, the test of the value regarding the threshold can be done.

S4 is the test for the first condition to consider that the GoP of the low resolution program stream is redundant with the GoP of the high resolution program stream for a receiver. If the GoP is redundant, nothing is done with the GoP and the process loops to S2. If the GoP is not redundant, the process continues to S5.

S5 is the test for the second condition to consider that the GoP of the low resolution program stream is redundant with the GoP of the high resolution program stream for a receiver. If the GoP is redundant, nothing is done with the GoP and the process loops to S2. If the GoP is not redundant, the process continues to S6.

S6 is the step when the GoP of the low resolution program stream is outputted from the analyzer since it is not detected as redundant with the GoP of the full resolution program stream. The analyzer process then loops to S2 to analyze the next pair of PTS.

Obviously, the invention is not limited to the preferred embodiment described.

In particular, the invention is not limited to video program encoded according to a standard MPEG2 format and can be applied to any other video compression standard.

The invention also applies to a broadband transmission of a video program where the program delivered by the source is transmitted by using two program streams (a high resolution program stream and an additional low resolution program stream) in a multicast link by using some network protocols.

Advantageously, the GoP analyzer can be implemented outside the encoder, in a standalone device or in any other device used for further treatment in the transmission path.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

The invention claimed is:

1. A method for distributing a video program comprising:
    encoding a video program in a first video stream which has a first level of picture resolution, said first video stream comprising first groups of pictures and first time information associated with each of said first groups of pictures,
    encoding a video program in a second video stream which has a second level of picture resolution, said second level of picture resolution being lower than said first level of picture resolution, said second video stream comprising second groups of pictures and a second time information associated with each of said second group of pictures,
    wherein said method further comprises conditionally transmitting an $m^{th}$ group of pictures of said second groups of pictures as a function of a duration ($GOP_F$) of each of said first groups of pictures and a time interval between a first time information $PTS_{Hn}$ of an $n^{th}$ group of pictures of said first groups of pictures and a second time information $PTS_{Lm}$ of said $m^{th}$ group of pictures.

2. The method according to claim 1, wherein said first and second time information are presentation time stamps according to MPEG compression standards.

3. The method according to claim 1, wherein the first and second video streams are compliant to MPEG-2 standard.

4. The method according to claim 1, wherein said $m^{th}$ group of pictures of said second groups of pictures is transmitted according to a comparison as follows:

$$\alpha \le (PTS_{Lm} - PTS_{Hn})/GOP_F \le \beta$$

where α and β are encoding parameters, said first time information $PTS_{Hn}$ of said $n^{th}$ group of pictures of said first groups of pictures is a presentation time stamp of an I-picture of said $n^{th}$ group of pictures of said first groups of pictures, and said second time information $PTS_{Lm}$ of said $m^{th}$ group of pictures of said second groups of pictures is a presentation time stamp of an I-picture of the $m^{th}$ group of pictures of said second groups of pictures, and $GOP_F$ is the duration of each of said first groups of pictures.

5. An analyzer module configured to receive a first video program and a second video program and to deliver a third video program, said video programs being composed of successive groups of pictures comprising time information associated with an I-picture of each of said groups of pictures, and configured for transmitting conditionally said groups of pictures of said second video program to build said third video program, an $m^{th}$ group of pictures of said groups of pictures of said second video program being transmitted as a function of a comparison between a time interval between a time information $PTS_{Hn}$ of an $n^{th}$ group of pictures of said groups of pictures of said first video program and a time information $PTS_{Lm}$ of said $m^{th}$ group of pictures, and an encoding parameter multiplied by a duration of each of said first groups of pictures of said first video program.

6. A video encoder comprising
    a high resolution encoding module encoding a first video program and a low resolution encoding module encoding a second video program, said video programs being composed of successive groups of pictures comprising time information associated with an I-picture of each of said groups of pictures, and
    an analyzer module configured to transmit conditionally said groups of pictures of said second video program to build a third video program, an $m^{th}$ group of pictures of said groups of pictures of said second video program being transmitted as a function of a comparison between a time interval between a time information $PTS_{Hn}$ of a $n^{th}$ group of pictures of said groups of pictures of said first video program, and a time information $PTS_{Lm}$ of said $m^{th}$ group of pictures of said groups of pictures of said second video program, and an encoding parameter multiplied by a duration of each of said first groups of pictures of said first video program.

7. A method for distributing a video program comprising:
encoding a video program in a first video stream which has a first level of picture resolution, said first video stream comprising first groups of pictures and a first presentation time stamp of an I-picture of each of said first groups of pictures,
encoding a video program in a second video stream which has a second level of picture resolution, said second level of picture resolution being lower than said first level of picture resolution, said second video stream comprising second groups of pictures and a second presentation time stamp of an I-picture of each of said second groups of pictures,
wherein said method further comprises the step of conditionally transmitting said second groups of pictures, said second groups of pictures being transmitted according to a comparison defined as follows:

$$\alpha \le (PTS_{Lm} - PTS_{Hn})/GOP_F \le \beta$$

where $\alpha$ and $\beta$ are encoding parameters, $PTS_{Hn}$ is the first presentation time stamp of the $n^{th}$ group of pictures of said first groups of pictures, $PTS_{Lm}$ is the second presentation time stamp of the $m^{th}$ group of pictures of said second groups of pictures, and $GOP_F$ is a duration of each of said first groups of pictures.

8. An analyzer module configured to receive a first video program and a second video program and to deliver a third video program, said video programs being composed of successive groups of pictures comprising a presentation time stamp of an I-picture of each of said groups of pictures, the analyzer module being configured to conditionally transmit said groups of pictures of said second video program to build said third video program, said second groups of pictures being transmitting according to a comparison defined as follows:

$$\alpha \le (PTS_{Lm} - PTS_{Hn})/GOP_F \le \beta,$$

where $\alpha$ and $\beta$ are encoding parameters, $PTS_{Hn}$ is a presentation time stamp of the $n^{th}$ group of pictures of said groups of pictures of said first video program, $PTS_{Lm}$ is a presentation time stamp of the $m^{th}$ group of pictures of said groups of pictures of said second video program, and $GOP_F$ is a duration of each of said first groups of pictures.

9. A video encoder comprising:
a high resolution encoding module encoding a first video program and a low resolution encoding module encoding a second video program, said video programs being composed of successive groups of pictures comprising a presentation time stamp of an I-picture of each of said groups of pictures, and an analyzer module configured to conditionally transmit said groups of pictures of said second video program to build a third video program, said second groups of pictures being transmitted according to a comparison defined as follows:

$$-\alpha \le (PTS_{Lm} - PTS_{Hn})/GOP_F \le \beta$$

where $\alpha$ and $\beta$ are encoding parameters, $PTS_{Hn}$ is a presentation time stamp of the $n^{th}$ group of pictures of said groups of pictures of said first video program, $PTS_{Lm}$ is a presentation time stamp of the $m^{th}$ group of pictures of said groups of pictures of said second video program, and $GOP_F$ is a duration of each of said first groups of pictures.

10. The analyzer module according to claim 5, wherein said first and second time information are presentation time stamps according to MPEG compression standards.

11. The analyzer module according to claim 5, wherein the first and second video streams are compliant to MPEG-2 standard.

12. The analyzer module according to claim 5, wherein said $m^{th}$ group of pictures of said second groups of pictures is transmitted according to a comparison defined as follows:

$$\alpha \le (PTS_{Lm} - PTS_{Hn})/GOP_F \le \beta$$

where $\alpha$ and $\beta$ are encoding parameters, said first time information $PTS_{Hn}$ of said $n^{th}$ group of pictures of said first groups of pictures is a presentation time stamp of the I-picture of-said $n^{th}$ group of pictures of said first groups of pictures, and said second time information $PTS_{Lm}$ of said $m^{th}$ group of pictures of said second groups of pictures is a presentation time stamp of the I-picture of the $m^{th}$ group of pictures of said second groups of pictures, and $GOP_F$ is the duration of each of said first groups of pictures.

13. The video encoder according to claim 6, wherein said first and second time information are presentation time stamps according to MPEG compression standards.

14. The video encoder according to claim 6, wherein the first and second video streams are compliant to MPEG-2 standard.

15. The video encoder according to claim 6, wherein said $m^{th}$ group of pictures of said second groups of pictures is transmitted according to a comparison of said time interval with an encoding parameter multiplied by said duration defined as follows:

$$\alpha \le (PTS_{Lm} - PTS_{Hn})/GOP_F \le \beta$$

where $\alpha$ and $\beta$ are encoding parameters, said first time information $PTS_{Hn}$ of said $n^{th}$ group of pictures of said first groups of pictures is the presentation time stamp of the I-picture of-said $n^{th}$ group of pictures of said first groups of pictures, and said second time information $PTS_{Lm}$ of said $m^{th}$ group of pictures of said second groups of pictures is the presentation time stamp of the I-picture of the $m^{th}$ group of pictures of said second groups of pictures, and $GOP_F$ is the duration of each of said first groups of pictures.

16. A method for distributing a video program comprising:
encoding said video program in a first video stream which has a first level of picture resolution, said first video stream comprising first groups of pictures and first time information associated with each of said first groups of pictures,
encoding-said video program in a second video stream which has a second level of picture resolution, said second level of picture resolution being lower than said first level of picture resolution, said second video stream comprising second groups of pictures and second time information associated with each of said second group of pictures,
wherein said method further comprises conditionally transmitting said second groups of pictures, an $m^{th}$ group of pictures of said second groups of pictures being transmitted as a function of a duration ($GOP_F$) of each of said first groups of pictures and a time interval between a first time information $PTS_{Hn}$ of an $n^{th}$ group of pictures of said first groups of pictures and a second time information $PTS_{Lm}$ of said $m^{th}$ group of pictures.

* * * * *